(12) United States Patent
Ohno

(10) Patent No.: US 6,519,097 B2
(45) Date of Patent: Feb. 11, 2003

(54) GAUSSIAN LENS FOR PHOTOGRAPHY

(75) Inventor: Kazunori Ohno, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/800,661

(22) Filed: Mar. 8, 2001

(65) Prior Publication Data

US 2001/0050819 A1 Dec. 13, 2001

(30) Foreign Application Priority Data

Mar. 28, 2000 (JP) ........................................ 2000-089202

(51) Int. Cl.$^7$ ................................................. G02B 9/62
(52) U.S. Cl. ........................ 359/760; 359/759; 359/756
(58) Field of Search ............................... 359/760, 759, 359/756, 757

(56) References Cited

U.S. PATENT DOCUMENTS

| | | | | |
|---|---|---|---|---|
| 4,045,127 A | * | 8/1977 | Matsubara | 359/740 |
| 4,908,639 A | | 3/1990 | Yanagisawa | 359/740 |
| 5,388,003 A | | 2/1995 | Naganuma et al. | 359/649 |
| 6,101,049 A | | 8/2000 | Noda | 359/760 |

FOREIGN PATENT DOCUMENTS

| | | |
|---|---|---|
| JP | 6-337348 | 12/1994 |
| JP | 8-33512 | 3/1996 |
| JP | 8-220424 | 8/1996 |
| JP | 11-183792 | 7/1999 |

* cited by examiner

*Primary Examiner*—Jordan M. Schwartz
*Assistant Examiner*—Tim Thompson
(74) *Attorney, Agent, or Firm*—Arnold International; Bruce Y. Arnold

(57) ABSTRACT

A Gaussian lens for photography includes, in order from the object side, a front lens group, a stop, and a rear lens group. The front lens group is formed of, in order from the object side, a first lens element and a second lens element, each of positive meniscus shape with their convex surfaces on the object side, and a third lens element that has a negative meniscus shape with its convex surface on the object side. The rear lens group is formed of, in order from the object side, a fourth lens element which has a negative meniscus shape with its concave surface on the object side, and fifth and sixth lens elements each of which is a positive meniscus lens with its convex surface on the image side. Each lens element surface is spaced from any adjacent lens elements so that no lens element surfaces are joined to form a combined lens. Further, specified conditions are satisfied to ensure that the Gaussian lens for photography has high optical performance, provides a flat image surface over the entire field of view, and may be readily manufactured so as to keep production costs low.

15 Claims, 5 Drawing Sheets

GAUSSIAN LENS FOR PHOTOGRAPHY

BACKGROUND OF THE INVENTION

Gaussian lenses are conventionally used as a standard bright lens for photography and various types of these lenses have been developed for various purposes, such as for realizing a large aperture, compactness, high performance, and low cost. For example, Gaussian lenses disclosed in Japanese Laid Open Patent Applications Nos. H6-337348 and H11-183792 are known. These lenses include a joined lens within one of front and rear lens groups that are positioned on either side of a stop.

The two joined surfaces of a joined lens are very critical in considering aberrations because they tend to have a large curvature to ensure a small Petzval's sum and achromatism. In the conventional Gaussian lenses described above, spacing lens surfaces (i.e., so that they are in air) is useful for increasing the parameters available for control of aberrations. More specifically, spacing the lens surfaces allows the spherical aberration and astigmatism to be more satisfactorily corrected in order to improve performance of the lens. However, spaced surfaces in air tend to produce large aberrations. This imposes a need for high precision in assembling the lens components and this may impair the suitability of the lens design for manufacturing. Thus, some lens element surfaces are usually joined.

Producing a Gaussian lens which meets requirements such as being compact yet having a large aperture, high performance and low cost is usually accomplished using a glass material having a high index of refraction. Such a glass material, unfortunately, is difficult to work (in terms of shaping a lens component), and the lens elements formed of such a material often require a high precision of assembly. Therefore, for standard camera lenses that are to be mass produced, suitability of the lens design for manufacturing and assembly is often emphasized with the result that lens performance may suffer.

As Gaussian lenses without joined surfaces, Japanese Patent No. H8-33512 and Japanese Laid Open Patent Application No. H8-220424 describe Gaussian lenses wherein all the lens elements are separated by air. However, these Gaussian lenses, formed of front and rear lens groups with each lens group consisting of three lens elements, have rather narrow image angles.

BRIEF SUMMARY OF THE INVENTION

The present invention relates to a high performance Gaussian lens for photography which is suitable for use with a single lens reflex camera. The object of the present invention is to provide a Gaussian lens that forms a flat image surface for the entire range of image angles. This is accomplished by using lens element surfaces which are all spaced apart in air, while ensuring that the Gaussian lens may be manufactured using conventional methods at a reasonable cost.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
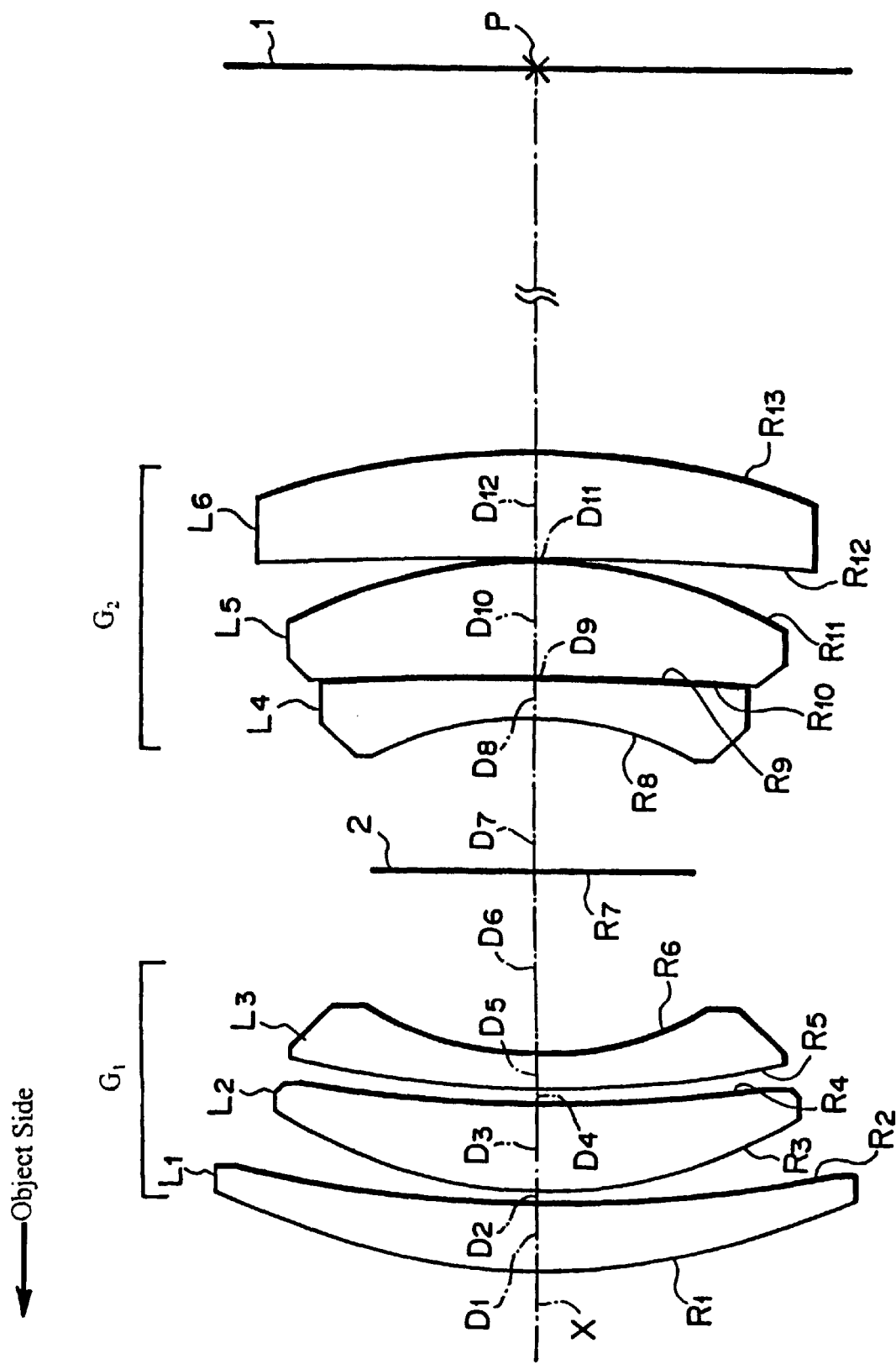
FIG. 1 is a schematic view showing the basic lens element configuration of the Gaussian lens for photography according to the present invention.

The present invention is a high-performance Gaussian lens for photography having, in order from the object side, a front lens group, a stop, and a rear lens group. The front lens group is formed of, in order from the object side, first and second lens elements which are positive meniscus lenses with their convex surfaces on the object side, and a third lens element which is a negative meniscus lens with its convex surface on the object side. The rear lens group is formed of, in order from the object side, a fourth lens element which is a negative meniscus lens with its concave surface on the object side, and fifth and sixth lens elements which are each positive meniscus lenses with their convex surfaces on the image side. Each lens element is spaced in air from an adjacent lens element so that there are no joined lens surfaces within the Gaussian lens of the present invention. Further, the following Conditions (1)–(5) are satisfied.

| | |
|---|---|
| $2.6 < (N_1 - N_2)/(N_3 - N_2) < 4.3$ | Condition (1) |
| $1.0 < R_4/f < 2.3$ | Condition (2) |
| $1.0 < R_4/R_5 < 1.3$ | Condition (3) |
| $-3.5 < R_{10}/f < -1.4$ | Condition (4) |
| $1.1 < R_9/R_{10} < 1.6$ | Condition (5) | where $N_1$ is the index of refraction of the first lens element, $N_2$ is the index of refraction of the second lens element, $N_3$ is the index of refraction of the third lens element, $R_4$ is the radius of curvature of the second lens element on the image side;

$R_5$ is the radius of curvature of the third lens element on the object side;

$R_9$ is the radius of curvature of the fourth lens element on the image side, $R_{10}$ is the radius of curvature of the fifth lens element on the object side, and f is the focal length of the Gaussian lens.

The Gaussian lens of the present invention also preferably satisfies the following Conditions (6)–(8):

| | |
|---|---|
| $0.001 < (D_4 + D_9)/f < 0.017$ | Condition (6) |
| $0.22 < D_{6-7}/f < 0.30$ | Condition (7) |
| $0.18 < D_{8-12}/f < 0.25$ | Condition (8) | where $D_4$ is the on-axis distance between the adjacent second and third lens element surfaces, $D_9$ is the on-axis distance between the adjacent fourth and fifth lens element surfaces, $D_{6-7}$ is the on-axis distance between the adjacent third and fourth lens element surfaces, $D_{8-12}$ is the on-axis distance between the surface of the fourth lens element on the object side and the surface of the sixth lens element on the image side (i.e, the sum of $D_8$–$D_{12}$), and f is as defined above.

Furthermore, the Gaussian lens of the invention also preferably satisfies the following Conditions (9)–(11);

$$12.0 < v_2 - v_1 < 25.0 \quad \text{Condition (9)}$$

$$18.0 < v_2 - v_3 < 30.0 \quad \text{Condition (10)}$$

$$35.0 < v_3 < 45.0 \quad \text{Condition (11)}$$

where $v_1$ is the Abbe number of the material of the first lens element;

$v_2$ is the Abbe number of the material of the second lens element; and $v_3$ is the Abbe number of the material of the third lens element.

The Gaussian lens of the present invention provides the nearly adjacent surfaces of the second and third lens elements and then early adjacent surfaces of the fourth and fifth lens elements with relatively large radii of curvature. Each surface in a pair of these opposing surfaces that are nearly adjacent has the same sign (plus or minus) in its values of R. These nearly-adjacent, paired surfaces ensure that the Gaussian lens, overall, will have significantly smaller spherical aberration and curvature of field than in prior art Gaussian lenses.

The Gaussian lens for photography according to the present invention uses a first lens element which is a positive meniscus lens that produces very little spherical aberration and curvature of field. The first lens element has a relatively large aperture and is formed of glass material which has a high index of refraction, a moderate Abbe number, is relatively inexpensive and is not difficult to work (i.e., shape). The second and third lens elements should also be made of glass material so that the radii of curvature of the paired opposing surfaces can remain large. More specifically, the second lens element should be made of glass material having a relatively low index of refraction and a large Abbe number. The third lens element should be made of glass material having a relatively moderate index of refraction and a low Abbe number.

By the lens elements in the front lens group being made as described above, the Petzval sum and chromatic aberration may be carefully corrected. The object-side surface of the third lens element is made to have a smaller radius of curvature than the image-side surface of the second lens element. Thus, the space between the second and third lens elements serves as a positive air lens, producing high spherical aberration. This can make the overall spherical aberration generated by the front lens group significantly smaller and also prevent off-axis coma aberration in the sagittal direction.

As for the lens elements in the rear lens group, the fourth lens element (i.e, the lens element of this lens group nearest the object side) should be made of glass material having a relatively high index of refraction and a small Abbe number. The fifth lens element should be made of glass material which has a higher index of refraction and a larger Abbe number, as compared to the fourth lens element. The object-side surface of the fifth lens element has a smaller radius of curvature than the image-side surface of the fourth lens element. Thus, the space between the fourth and fifth lens elements serves as a negative air lens, preventing high spherical aberration from being generated by the rear lens group. This design is also useful for correction of curvature of field and astigmatism. Similar to the fifth lens element, the sixth lens element should be made of glass material having a high index of refraction and a large Abbe number. This allows for excellent correction of chromatic aberration and other aberrations in the rear lens group.

As is characteristic in Gaussian lenses, the front lens group and the rear lens group are nearly symmetrically positioned about a stop, so as to minimize chromatic aberrations and distortion. In the present invention, the positive air lens created between the second and third lens elements generates spherical aberration and coma in the sagittal direction that are of opposite sign to these aberrations produced by the other components of the Gaussian lens so as to minimize these aberrations in the Gaussian lens as a whole. Similarly, the negative air lens created between the fourth and fifth lens elements is used to minimize the curvature of field of the Gaussian lens as a whole. By satisfying the above conditions, a flat image surface of high resolution is obtained for the entire field of view. Further, the Gaussian lens of the present invention is well-suited for easy manufacturing and thus may be readily mass produced.

The present invention will now be described in general terms with reference to the drawings. FIG. 1 shows the basic lens element configuration for each described embodiment of the present invention. As shown in FIG. 1, the Gaussian lens is formed of, in order from the object side, a front lens group $G_1$, a stop 2, and a rear lens group $G_2$. Light flux coming from the object passes along the optical axis X and is focused at an image point P on the image plane 1.

The front lens group $G_1$ is formed of, in order from the object side, a first lens element $L_1$ and a second lens element $L_2$ which are each positive meniscus lenses with their convex surfaces on the object side, and a third lens element $L_3$ which is a negative meniscus lens with its convex surface on the object side. The rear lens group $G_2$ is formed of, in order from the object side, a fourth lens element $L_4$ which is a negative meniscus lens with its concave surface on the object side, and a fifth lens element $L_5$ and a sixth lens element $L_6$ which are each positive meniscus lenses with their convex surfaces on the image side. Further, the above Conditions (1) to (11) are preferably satisfied.

The purpose of each Condition will now be described.

Condition (1) defines the refractive indices $N_1$, $N_2$, and $N_3$ of the lens elements of the front lens group $G_1$. The first lens element $L_1$ should be a positive meniscus lens, which produces a significantly smaller spherical aberration and curvature of field, for example, than does a biconvex lens. Accordingly, glass material having a high index of refraction is selected for this lens element. The lens elements $L_2$ and $L_3$ should be made of glass material in order to provide sufficient refractive power while avoiding small radii of curvature for their opposing surfaces. The glass material for the second lens element $L_2$ must have a low index of refraction and a high Abbe number. The glass material for the third lens element $L_3$ must have a moderate index of refraction and a smaller Abbe number than that of the second lens element. The positive air lens formed in the space between the second and third lens elements produces an appropriately high spherical aberration of opposite sign to allow the overall spherical aberration of the Gaussian lens to be significantly reduced.

When the value of $(N_1-N_2)/(N_3-N_2)$ in Condition (1) no longer satisfies the lower limit, the following problems will arise as a result of the difference in index of refraction between the first and second lens elements having decreased, the difference in index of refraction between the second and third lens elements having increased, or both. If the index of refraction of the first lens element becomes smaller, this will result in increased spherical aberration and curvature of field of the overall Gaussian lens. The index of refraction of the second lens element $L_2$ and the index of refraction of the third lens element $L_3$ must then increase. As a result, the air lens created by the opposing, nearly adjacent, surfaces of the second and third lens elements $L_2$ and $L_3$ must be of stronger negative refractive power in order for the overall Gaussian lens to remain achromatic. Thus, appropriately high spherical aberration of opposite sign to that of the other components of the Gaussian lens will no longer be produced by the air lens, resulting in an increase in overall spherical aberration and off-axis coma aberration in the sagittal direction of the Gaussian lens.

When the value of $(N_1-N_2)/(N_3-N_2)$ in Condition (1) exceeds the upper limit, the following problems will arise as a result of the difference in index of refraction between the first and second lens elements having increased, the difference in index of refraction between the second and third lens elements having decreased, or both. Increased index of refraction of the first lens element $L_1$ results in increasing the glass material cost and making the lens element harder to manufacture. If the difference in index of refraction between the second and third lens elements decreases, the radius of curvature of the opposing surfaces of these lens elements becomes too small, which will make achromatism difficult to correct and also produce other aberrations.

Condition (2) is to avoid problems in manufacturing caused by inappropriate spacing between the second lens element $L_2$ and the third lens element $L_3$. When the value of $R_4/f$ in Condition (2) no longer satisfies the lower limit, the radius of curvature $R_4$ of the image-side surface of the lens element $L_2$ will decrease and, accordingly, the radius of curvature $R_5$ of the object-side surface of the lens element $L_3$ will decrease. As a result, aberrations are likely to increase, such as coma, resulting in poor lens performance. On the other hand, when the value of $R_4/f$ in Condition (2) exceeds the upper limit, the radius of curvature $R_4$ of the object-side surface of the second lens element $L_2$ increases and, accordingly, the radius of curvature $R_5$ of the image-side surface of the third lens element $L_3$ increases. This causes the curvature of field to increase while the spherical aberration is reduced. In order to maintain a sufficiently large refractive power without decreasing the radius of curvature $R_4$ of the object-side surface of the second lens element $L_2$ and the radius of curvature $R_5$ of the image-side surface of the third lens element $L_3$, this will cause the cost of glass material to increase in order to avoid having a lens design that is difficult to manufacture or a lens material that is difficult to fabricate (i.e., work).

Condition (3) is to correct aberrations, such as spherical aberration and off-axial coma aberration in the sagittal direction, of the Gaussian lens in a balanced manner. This is achieved by the fact that the air lens created by the space between the opposing surfaces of the second lens element $L_2$ and third lens element $L_3$ produces an appropriately high spherical aberration to create a balancing effect, provided that Condition (2) is satisfied. When the value of $R_4/R_5$ in Condition (3) does not satisfy the lower limit, the positive refractive power of the air lens created by the space between the nearly adjacent, opposed surfaces of the second lens element $L_2$ and the third lens elements $L_3$ will become too small to produce an appropriately high spherical aberration, thus failing to improve the performance of the Gaussian lens. On the other hand, when the value of $R_4/R_5$ in Condition (3) exceeds the upper limit, the positive refractive power of the air lens created by the space between the nearly adjacent, opposed surfaces of the second lens element $L_2$ and the third lens element $L_3$ will become too large and produce excessively high spherical aberration. This also leads to deteriorated coma aberration and to severe sensitivity to eccentricity, causing difficulty in manufacturing the lens.

Conditions (4) and (5) control the refractive power of the air lens created by the space between the opposing surfaces of the fourth lens element $L_4$ and the fifth lens element $L_5$, based on the radii of curvature $R_9$ and $R_{10}$ of the nearly adjacent, opposed surfaces of the fourth lens element $L_4$ and the fifth lens element $L_5$ in the rear lens group. These conditions are mainly for maintaining a good image surface. When the value of $R_{10}/f$ in Condition (4) no longer satisfies the lower limit, the radius of curvature $R_{10}$ of the object-side surface of the fifth lens element $L_5$ must have become more negative and, accordingly, the radius of curvature $R_9$ of the image-side surface of the fourth lens element $L_4$ must also become more negative in order to maintain, for example, an appropriate focal length of the Gaussian lens. This will reduce the Petzval sum in order to maintain a good image surface. However, spherical aberration and chromatic aberration become problematic. Different materials may be selected for the fourth lens element $L_4$ and the fifth lens element $L_5$. However, this will result in raising the material cost and possibly require lens element materials that are more difficult to work (i.e., to shape).

When the value of $R_{10}/f$ in Condition (4) no longer meets the upper limit, the absolute value of the radius of curvature $R_{10}$ of the object-side surface of the fifth lens element $L_5$ must have decreased and, accordingly, the radius of curvature $R_9$ of the image-side surface of the fourth lens element $L_4$ will have decreased. This will result in a poorer image surface.

Condition (5) is to give a slightly positive refractive power to the air lens created by the space between the opposing surfaces of the fourth lens element $L_4$ and the fifth lens element $L_5$, provided that Condition (4) is satisfied for obtaining good off-axis performance by eliminating astigmatic differences in the tangential and sagittal directions. When the value of $R_9/R_{10}$ in Condition (5) no longer satisfies the lower limit, the image surface will incline more in the tangential direction than in the sagittal direction, increasing the astigmatism. On the other hand, when the value of $R_9/R_{10}$ in Condition (5) exceeds the upper limit, the image in the tangential direction will be enlarged more than the image in the sagittal direction, increasing the astigmatism.

Conditions (6) to (8) are to define the lens element placement for further improving manufacturing suitability, especially production cost. Satisfying these conditions allows the number of mechanical parts in a camera body to be reduced and eliminates manufacturing problems which arise from spaced surfaces. Condition (6) is to decrease the value of $D_4$ between the second lens element $L_2$ and the third lens element $L_3$ to thereby enable a proper spacing to be attained by simply inserting a MYLAR plate between the second lens element $L_2$ and the third lens element $L_3$. This also eliminates the need, for example, for a spacing ring and further reduces the cost of manufacture. Furthermore, by designing the on-axis spacing $D_9$ between the fourth lens element $L_4$ and the fifth lens element $L_5$ such that these lens elements contact each other at their edges, mechanical parts are eliminated and mounting precision of these lens elements is improved. When the value of $(D_4+D_9)/f$ in Condition (6) does not satisfy the lower limit, the spaces $D_4$ and $D_9$ will be excessively small, producing Newton's interference fringes between the opposing surfaces and rendering a very thin MYLAR plate assembly difficult. When the value of $(D_4+D_9)/f$ in Condition (6) exceeds the upper limit, a MYLAR plate will no longer be useful and a spacing ring should be used. The abutting lens element edges will have a larger diameter so that a costly redundant outer diameter which is larger than the lens element's useful diameter may be required. Using spaced surfaces rather than joining two surfaces requires additional mechanical parts for mounting the spaced surfaces and, additionally, in order to prevent reflection of light at the air/glass interfaces, requires that index of refraction matching coatings be applied to the separated surfaces. This may or may not raise production costs, since joining two surfaces to form a combined lens is itself time-consuming and thus costly. Therefore, a joined lens is not always economically advantageous.

Condition (7) defines the space $D_{6-7}$ between the front lens group $G_1$ and the rear lens group $G_2$. When the value of $D_{6-7}/f$ in Condition (7) does not satisfy the lower limit, peripheral light in the front lens group $G_1$ and in the rear lens groups $G_2$ will increase while contrast will decrease because excessive coma aberration in the sagittal direction at off-axial, middle image angles cannot be cut off. In addition, a lens holder ring cannot be received at the lens surface so that the lens cannot be held in a precise manner, changing the space $D_{6-7}$ and causing an unstable curvature of field. When the value of $D_{6-7}/f$ in Condition (7) exceeds the upper limit, the peripheral light will decrease and the lens system aperture will become too large.

Condition (8) defines the on-axis spacing $D_{8-12}$ between the object-side surface of the fourth lens element $L_4$ and the image-side surface of the sixth lens element $L_6$, (i.e. this is the sum of the individual on-axis spacings $D_{8-12}$). Single lens reflex cameras require an appropriate back focal length, but lens elements that are too thick are inappropriate. Condition (8) ensures both appropriate back focal length and lens elements that are not too thick. When the value of $D_{8-12}/f$ in Condition (8) does not satisfy the lower limit, a sufficient back focal length will not be obtained. When the value of $D_{8-12}/f$ in Condition (8) exceeds the upper limit, the lens elements will be excessively thick, thereby increasing the size, weight and cost of the Gaussian lens for photography.

Conditions (9) to (11) define relationships of the Abbe values $v_1-v_3$ of the glass materials used for the lens elements $L_1-L_3$, respectively, of the front lens group $G_1$. These conditions are important for selecting glass materials for these lens elements that reduce cost and provide ease of manufacture. By satisfying Conditions (9) to (11), in addition to satisfying Conditions (1) to (5), a combination of reduced cost and the use of glass materials having relatively good workability is achieved, leading to a suitable manufacturing process.

Condition (9) is to select materials for the first and second lens elements $L_1$ and $L_2$. When the value of $v_2-v_1$ in Condition (9) does not satisfy the lower limit, the Abbe numbers of the glass materials of the first and second lens elements $L_1$ and $L_2$ will be too small. Negative lateral color aberration increases when the Abbe number of the glass material of the first lens element $L_1$ increases, while axial chromatic aberration is not satisfactorily corrected when the Abbe number of the glass material of the second lens element $L_2$ decreases. Therefore, lateral color and axial chromatic aberration will no longer be in balance. Even though the Abbe number of the material of the third lens element $L_3$ may be changed to solve this problem, it will be very difficult to satisfactorily correct lateral color. Consequently, aberration correction must be performed at the opposing surfaces of the second and third lens elements $L_2$ and $L_3$, with the result that Condition (2) will not be satisfied. When the value of $v_2-v_1$ in Condition (9) exceeds the upper limit, positive lateral color will increase due to the decreased Abbe number $v_1$ of the glass material of the first lens element $L_1$ while axial chromatic aberration will be excessively corrected for the increased Abbe number $v_2$ of the glass material of the second lens element $L_2$. As is described above, aberration correction would have to be performed at the opposing surfaces of the second and third lens elements $L_2$ and $L_3$, with a result that Condition (2) would not be satisfied.

Condition (10) is to select materials for the second and third lens elements $L_2$ and $L_3$. When the value of $V_2-V_3$ in Condition (10) does not satisfy the lower limit, the Abbe numbers of the glass material of the second and third lens elements $L_2$ and $L_3$ will be too small. Axial chromatic aberration will not be satisfactorily corrected, and thus the Gaussian lens will not be achromatic. Lateral color will be too large to correct by changing the Abbe number of the material of the first lens element $L_1$. Consequently, aberration correction must be performed at the opposing surfaces of the second and third lens elements $L_2$ and $L_3$, with the result that Condition (2) will not be satisfied. When the value of $v_2-v_3$ in Condition (10) exceeds the upper limit, axial chromatic aberration will be excessive. To correct this, aberration correction must be performed at the opposing surfaces of the second and third lens elements $L_2$ and $L_3$ with the result that Condition (2) will not be satisfied.

Condition (11) defines the range of Abbe number $v_3$ of the material selected for the third lens element $L_3$. When the value of $v_3$ in Condition (11) is not in the prescribed range of values, axial chromatic aberration will not be corrected in a balanced manner. Therefore, the material of the second lens element $L_2$ will need to have either a smaller or larger Abbe number. This makes the selection of material for the first to third lens elements $L_1$ to $L_3$ difficult, in order to insure that Conditions (1) to (5) are satisfied.

Several specific embodiments of the invention will now be set forth in detail.

Embodiment 1

Table 1 below lists, in order from the object side: the surface number #, the radius of curvature R (in mm), the on-axis surface spacing D (in mm), as well as the index of refraction $N_d$ and the Abbe number $v_d$ (at the line d) of each lens element of Embodiment 1. In the middle portion of the table are listed the focal length f, the back focal length Bf, the f-number $F_{NO}$, and the image angle $2\omega$ of the Gaussian lens of this embodiment. The bottom portion of the table lists the values of Conditions (1) to (11) for this embodiment.

TABLE 1

| # | R | D | $N_d$ | $v_d$ |
|---|---|---|---|---|
| 1 | 50.7069 | 5.5476 | 1.78589 | 44.2 |
| 2 | 106.2158 | 0.9320 | | |
| 3 | 36.1000 | 6.9900 | 1.51680 | 64.1 |
| 4 | 116.9168 | 1.2316 | | |
| 5 | 92.5104 | 2.5963 | 1.60342 | 38.0 |
| 6 | 24.5007 | 14.7936 | | |
| 7 | ∞(stop) | 12.3280 | | |
| 8 | −26.5213 | 3.2620 | 1.72825 | 28.5 |
| 9 | −358.8529 | 0.1466 | | |
| 10 | −274.5948 | 9.2460 | 1.77250 | 49.6 |
| 11 | −38.0847 | 0.2466 | | |

TABLE 1-continued

| 12 | −425.0565 | 8.6296 | 1.80610 | 40.9 |
| 13 | −59.9964 | | | | f = 100.000 mm    Bf = 76.936 mm    $F_{NO}$ = 2.9    2ω = 46.7°

| Condition (1) value: | $(N_1-N_2)/(N_3-N_2)$ = | 3.107 |
| Condition (2) value: | $R_4/f$ = | 1.169 |
| Condition (3) value: | $R_4/R_5$ = | 1.264 |
| Condition (4) value: | $R_{10}/f$ = | −2.746 |
| Condition (5) value: | $R_9/R_{10}$ = | 1.307 |
| Condition (6) value: | $(D_4 + D_9)/f$ = | 0.014 |
| Condition (7) value: | $D_{6-7}/f$ = | 0.271 |
| Condition (8) value: | $D_{8-12}/f$ = | 0.215 |
| Condition (9) value: | $v_2-v_1$ = | 19.9 |
| Condition (10) value: | $v_2-v_3$ = | 26.1 |
| Condition (11) value: | $v_3$ = | 38.0 |

As is apparent from comparing the values given in the bottom part of Table 1, with the above Conditions (1) to (11), each of the Conditions (1) to (11) is satisfied by this embodiment.

Figures 2A, 2B, 2C:
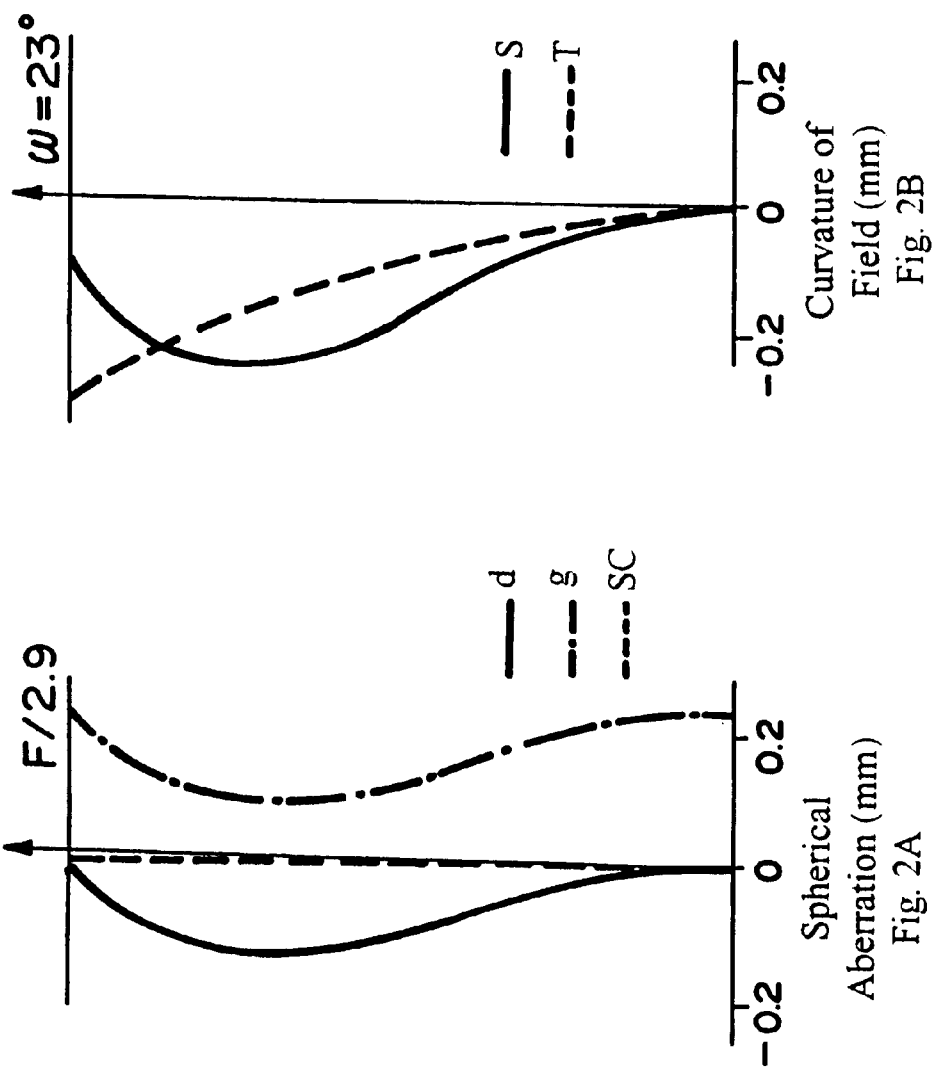
FIGS. 2A–2C show the spherical aberration, curvature of field, and distortion, respectively, for Embodiment 1.

FIGS. 2A–2C show the spherical aberration, curvature of field, and distortion, respectively, for Embodiment 1. In FIG. 2A, showing the spherical aberration, a curve for the Sine Condition SC, as well as curves for both the d and g lines are illustrated. In FIG. 2B, the curvature of field in both the sagittal S and tangential T directions is illustrated. As is apparent from FIGS. 2A to 2C, the various aberrations are satisfactorily corrected for this embodiment of the invention.

Embodiment 2

Table 2 below lists, in order from the object side: the surface number #, the radius of curvature R (in mm), the on-axis surface spacing D (in mm), as well as the index of refraction $N_d$ and the Abbe number $v_d$ (at the line d) of each lens element of Embodiment 2. In the middle portion of the table are listed the focal length f, the back focal length Bf, the f-number $F_{NO}$, and the image angle 2ω of the Gaussian lens of this embodiment. The bottom portion of the table lists the values of Conditions (1) to (11) for this embodiment.

TABLE 2

| # | R | D | $N_d$ | $v_d$ |
|---|---|---|---|---|
| 1 | 48.2484 | 5.8520 | 1.78589 | 44.2 |
| 2 | 112.3889 | 1.2179 | | |
| 3 | 37.1741 | 7.4327 | 1.51680 | 64.1 |
| 4 | 191.3033 | 0.1317 | | |
| 5 | 160.1187 | 2.5675 | 1.59318 | 38.7 |
| 6 | 24.4616 | 14.6299 | | |
| 7 | ∞(stop) | 12.1915 | | |
| 8 | −26.7739 | 3.2259 | 1.70988 | 29.5 |
| 9 | −420.2059 | 0.1761 | | |
| 10 | −291.5150 | 9.1437 | 1.77250 | 49.6 |
| 11 | −38.6085 | 0.2438 | | |
| 12 | −379.4235 | 8.7779 | 1.78589 | 44.2 |
| 13 | −59.1449 | | | | f = 100.000 mm    Bf = 76.077 mm    $F_{NO}$ = 2.9    2ω = 46.7°

| Condition (1) value: | $(N_1-N_2)/(N_3-N_2)$ = | 3.523 |
| Condition (2) value: | $R_4/f$ = | 1.913 |
| Condition (3) value: | $R_4/R_5$ = | 1.195 |
| Condition (4) value: | $R_{10}/f$ = | −2.915 |
| Condition (5) value: | $R_9/R_{10}$ = | 1.441 |
| Condition (6) value: | $(D_4 + D_9)/f$ = | 0.003 |
| Condition (7) value: | $D_{6-7}/f$ = | 0.268 |
| Condition (8) value: | $D_{8-12}/f$ = | 0.216 |
| Condition (9) value: | $v_2-v_1$ = | 19.9 |

TABLE 2-continued

| Condition (10) value: | $v_2-v_3$ = | 25.4 |
| Condition (11) value: | $v_3$ = | 38.7 |

As is apparent from comparing the values given in the bottom part of Table 2, with the above Conditions (1) to (11), each of the Conditions (1) to (11) is satisfied by this embodiment.

Figure 3C:
FIGS. 3A–3C show the spherical aberration, curvature of field, and distortion, respectively, for Embodiment 2.
Figure 3B:
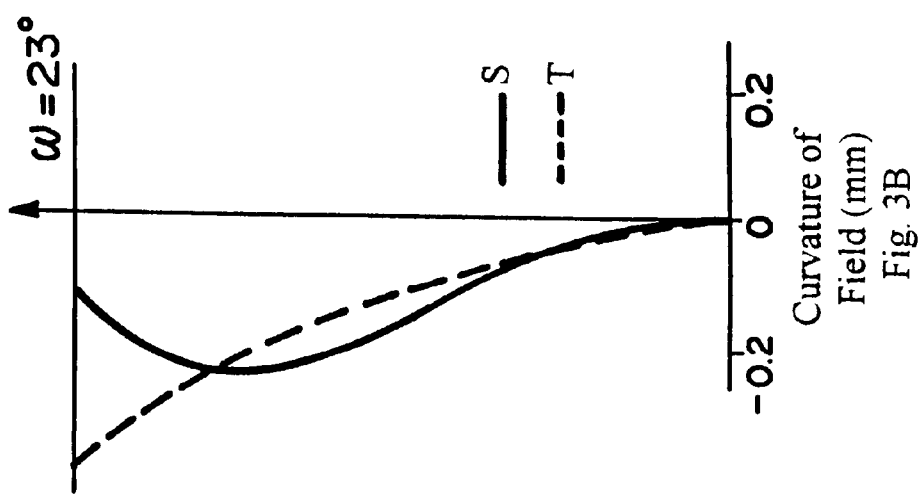
Figure 3A:
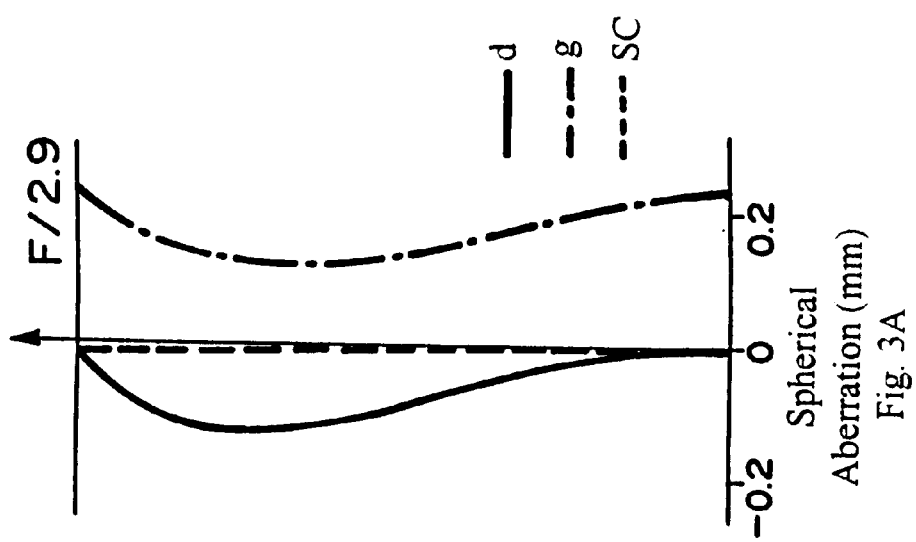

FIGS. 3A–3C show the spherical aberration, curvature of field, and distortion, respectively, for Embodiment 2. In FIG. 3A, showing the spherical aberration, a curve for the Sine Condition SC, as well as curves for both the d and g lines are illustrated. In FIG. 3B, the curvature of field in both the sagittal S and tangential T directions is illustrated. As is apparent from FIGS. 3A to 3C, the various aberrations are satisfactorily corrected for this embodiment of the invention.

Embodiment 3

Table 3 below lists, in order from the object side: the surface number #, the radius of curvature R (in mm), the on-axis surface spacing D (in mm), as well as the index of refraction $N_d$ and the Abbe number $v_d$ (at the line d) of each lens element of Embodiment 3. In the middle portion of the table are listed the focal length f, the back focal length Bf, the f-number $F_{NO}$, and the image angle 2ω of the Gaussian lens of this embodiment. The bottom portion of the table lists the values of Conditions (1) to (11) for this embodiment.

TABLE 3

| # | R | D | $N_d$ | $v_d$ |
|---|---|---|---|---|
| 1 | 47.5493 | 5.8309 | 1.78589 | 44.2 |
| 2 | 110.7501 | 1.2136 | | |
| 3 | 36.2705 | 7.4828 | 1.51680 | 64.1 |
| 4 | 164.6727 | 0.0590 | | |
| 5 | 138.2651 | 2.5583 | 1.60342 | 38.0 |
| 6 | 24.0395 | 14.5773 | | |
| 7 | ∞(stop) | 12.1477 | | |
| 8 | −26.8994 | 3.2434 | 1.72825 | 28.5 |
| 9 | −253.6194 | 0.2502 | | |
| 10 | −174.5745 | 9.1108 | 1.78589 | 44.2 |
| 11 | −39.2360 | 0.2430 | | |
| 12 | −618.1006 | 8.5034 | 1.74330 | 49.3 |
| 13 | −55.9127 | | | | f = 100.000 mm    Bf = 76.090 mm    $F_{NO}$ = 2.9    2ω = 46.7°

| Condition (1) value: | $(N_1-N_2)/(N_3-N_2)$ = | 3.107 |
| Condition (2) value: | $R_4/f$ = | 1.647 |
| Condition (3) value: | $R_4/R_5$ = | 1.191 |
| Condition (4) value: | $R_{10}/f$ = | −1.746 |
| Condition (5) value: | $R_9/R_{10}$ = | 1.453 |
| Condition (6) value: | $(D_4 + D_9)/f$ = | 0.003 |
| Condition (7) value: | $D_{6-7}/f$ = | 0.267 |
| Condition (8) value: | $D_{8-12}/f$ = | 0.214 |
| Condition (9) value: | $v_2-v_1$ = | 19.9 |
| Condition (10) value: | $v_2-v_3$ = | 26.1 |
| Condition (11) value: | $v_3$ = | 38.0 |

As is apparent from comparing the values given in the bottom part of Table 3, with the above Conditions (1) to (11), each of the Conditions (1) to (11) is satisfied by this embodiment.

Figure 4C:
FIGS. 4A–4C show the spherical aberration, curvature of field, and distortion, respectively, for Embodiment 3.
Figure 4B:
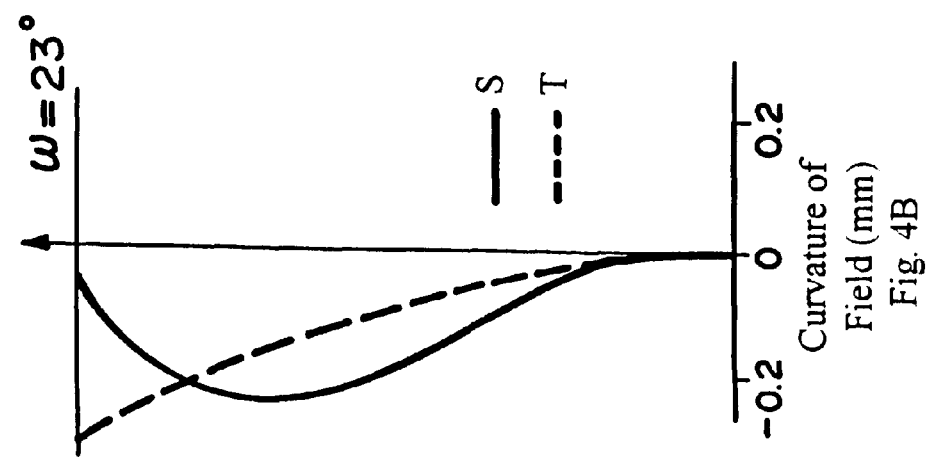
Figure 4A:
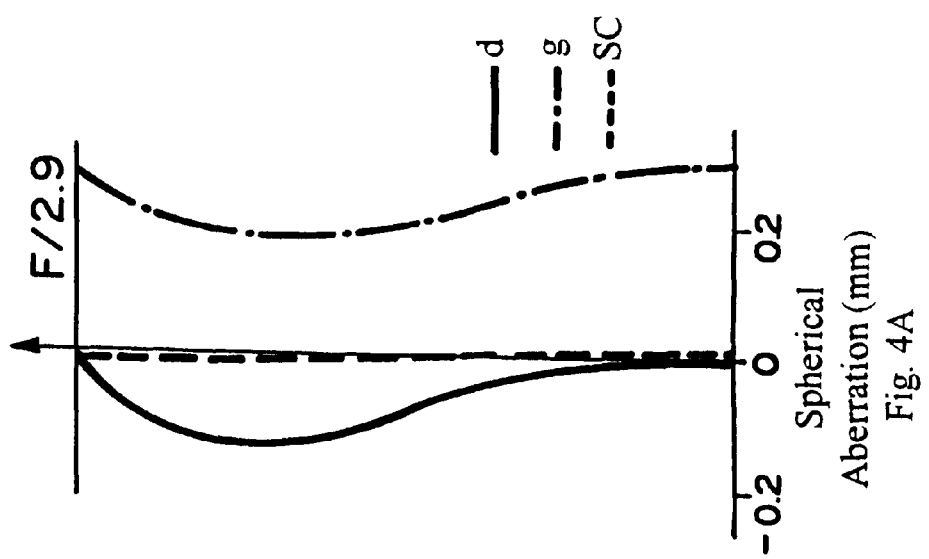

FIGS. 4A–4C show the spherical aberration, curvature of field, and distortion, respectively, for Embodiment 3. In FIG. 4A, showing the spherical aberration, a curve for the Sine Condition SC, as well as curves for both the d and g lines are illustrated. In FIG. 4B, the curvature of field in both the sagittal S and tangential T directions is illustrated. As is apparent from FIGS. 4A to 4C, the various aberrations are satisfactorily corrected for this embodiment of the invention.

Embodiment 4

Table 4 below lists, in order from the object side: the surface number #, the radius of curvature R (in mm), the on-axis surface spacing D (in mm), as well as the index of refraction $N_d$ and the Abbe number $v_d$ (at the line d) of each lens element of Embodiment 4. In the middle portion of the table are listed the focal length f, the back focal length Bf, the f-number $F_{NO}$, and the image angle 2ω of the Gaussian lens of this embodiment. The bottom portion of the table lists the values of Conditions (1) to (11) for this embodiment.

TABLE 4

| # | R | D | $N_d$ | $v_d$ |
|---|---|---|---|---|
| 1 | 47.5391 | 5.5083 | 1.74330 | 49.3 |
| 2 | 101.1445 | 0.9254 | | |
| 3 | 34.3890 | 6.9405 | 1.51680 | 64.1 |
| 4 | 139.3735 | 0.7271 | | |
| 5 | 112.7184 | 2.5779 | 1.57501 | 41.5 |
| 6 | 23.2344 | 14.6888 | | |
| 7 | ∞(stop) | 12.2407 | | |
| 8 | −27.2312 | 3.2389 | 1.69895 | 30.1 |
| 9 | −288.4567 | 0.2498 | | |
| 10 | −202.3480 | 9.1805 | 1.77250 | 49.6 |
| 11 | −40.7779 | 0.2448 | | |
| 12 | −402.7674 | 8.5685 | 1.77250 | 49.6 |
| 13 | −55.7645 | | | | f = 100.000 mm    Bf = 76.305 mm    $F_{NO}$ = 2.9    2ω = 46.7°

| Condition (1) value: | $(N_1-N_2)/(N_3-N_2)$ = | 3.891 |
|---|---|---|
| Condition (2) value: | $R_4/f$ = | 1.394 |
| Condition (3) value: | $R_4/R_5$ = | 1.236 |
| Condition (4) value: | $R_{10}/f$ = | −2.023 |
| Condition (5) value: | $R_9/R_{10}$ = | 1.426 |
| Condition (6) value: | $(D_4 + D_9)/f$ = | 0.010 |
| Condition (7) value: | $D_{6-7}/f$ = | 0.269 |
| Condition (8) value: | $D_{8-12}/f$ = | 0.215 |
| Condition (9) value: | $v_2-v_1$ = | 14.8 |
| Condition (10) value: | $v_2-v_3$ = | 22.6 |
| Condition (11) value: | $v_3$ = | 41.5 |

As is apparent from comparing the values given in the bottom part of Table 4, with the above Conditions (1) to (11), each of the Conditions (1) to (11) is satisfied by this embodiment.

Figure 5C:
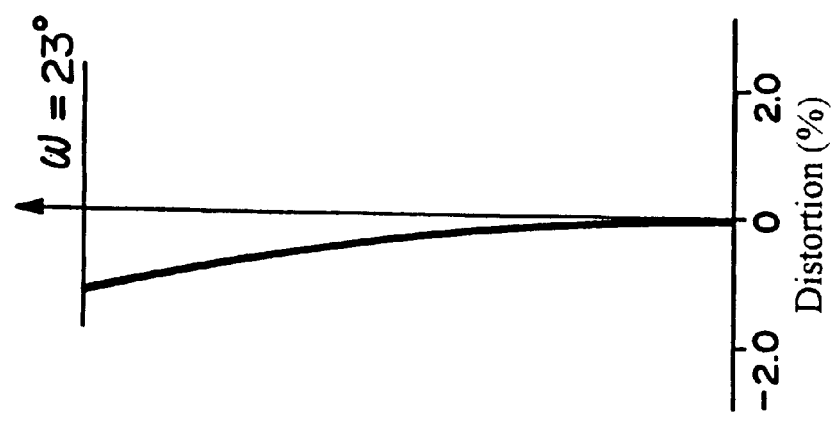
FIGS. 5A–5C show the spherical aberration, curvature of field, and distortion, respectively, for Embodiment 4.
Figure 5B:
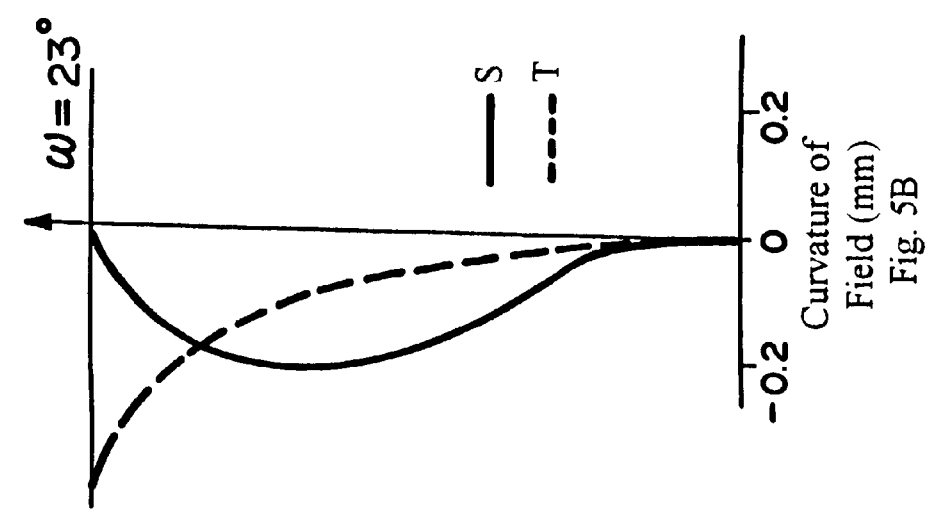
Figure 5A:
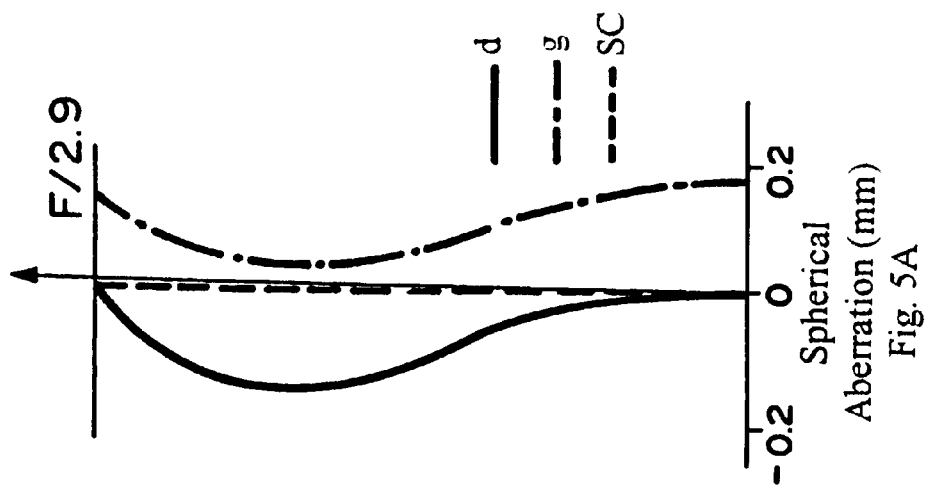

FIGS. 5A–5C show the spherical aberration, curvature of field, and distortion, respectively, for Embodiment 4. In FIG. 5A, showing the spherical aberration, a curve for the Sine Condition SC, as well as curves for both the d and g lines are illustrated. In FIG. 5B, the curvature of field in both the sagittal S and tangential T directions is illustrated. As is apparent from FIGS. 5A to 5C, the various aberrations are satisfactorily corrected for this embodiment of the invention.

The invention being thus described, it will be obvious that the same may be varied in many ways. For example, the radius of curvature R of each lens element and the lens element spacings D can be readily scaled to achieve a lens of a desired focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A Gaussian lens for photography comprising, in order from the object side:

a front lens group consisting of, in order from the object side, a first lens element and a second lens element, each having a positive meniscus shape with its convex surface on the object side, and a third lens element that has a negative meniscus shape with its convex surface on the object side;

a stop; and a rear lens group consisting of, in order from the object side, a fourth lens element which has a negative meniscus shape with its concave surface on the object side, and fifth and sixth lens elements each having a positive meniscus shape with its convex surface on the image side, wherein each lens element surface is spaced from any adjacent lens element surface so that no lens elements form a combined lens.

2. The Gaussian lens of claim 1, wherein the following conditions are satisfied:

$$2.6<(N_1-N_2)/(N_3-N_2)<4.3$$

$$1.0<R_4/f<2.3$$

$$1.0<R_4/R_5<1.3$$

$$-3.5<R_{10}/f<-1.4$$

$$1.1<R_9/R_{10}<1.6$$

where $N_1$ is the index of refraction of the first lens element, $N_2$ is the index of refraction of the second lens element, $N_3$ is the index of refraction of the third lens element, $R_4$ is the radius of curvature of the second lens element on the image side, f is the focal length of the Gaussian lens, $R_5$ is the radius of curvature of the third lens element on the object side, $R_{10}$ is the radius of curvature of the fifth lens element on the object side, and $R_9$ is the radius of curvature the fourth lens element on the image side.

3. The Gaussian lens of claim 1, wherein the following conditions are satisfied:

$$0.001<(D_4+D_9)/f<0.017$$

$$0.22<D_{6-7}/f<0.30$$

$$0.18<D_{8-12}/f<0.25$$

where $D_4$ is the on-axis distance between the adjacent second and third lens element surfaces, $D_9$ is the on-axis distance between the adjacent fourth and fifth lens element surfaces, $D_{6-7}$ is the on-axis distance between the adjacent third and fourth lens element surfaces, f is the focal length of the Gaussian lens, $D_{8-12}$ is the on-axis distance between the object side surface of the fourth lens element and the image side surface of the sixth lens element.

4. The Gaussian lens of claim 1, wherein the following conditions are satisfied:

$$12.0 < v_2 - v_1 < 25.0$$

$$18.0 < v_2 - v_3 < 30.0$$

$$35.0 < v_3 < 45.0$$

where $v_1$ is the Abbe number of the material of the first lens element, $v_2$ is the Abbe number of the material of the second lens element, and $v_3$ is the Abbe number of the material of the third lens element.

5. The Gaussian lens of claim 1, wherein the following condition is satisfied:

$$2.6 < (N_1 - N_2)/(N_3 - N_2) < 4.3$$

where $N_1$ is the index of refraction of the first lens element, $N_2$ is the index of refraction of the second lens element, and $N_3$ is the index of refraction of the third lens element.

6. The Gaussian lens of claim 1, wherein the following condition is satisfied:

$$1.0 < R_4/f < 2.3$$

where $R_4$ is the radius of curvature of the second lens element on the image side, and f is the focal length of the Gaussian lens.

7. The Gaussian lens of claim 1, wherein the following condition is satisfied:

$$1.0 < R_4/R_5 < 1.3$$

where $R_4$ is the radius of curvature of the second lens element on the image side, and $R_5$ is the radius of curvature of the third lens element on the object side.

8. The Gaussian lens of claim 1, wherein the following condition is satisfied:

$$-3.5 < R_{10}/f < -1.4$$

where $R_{10}$ is the radius of curvature of the fifth lens element on the object side, and f is the focal length of the Gaussian lens.

9. The Gaussian lens of claim 1, wherein the following condition is satisfied:

$$1.1 < R_9/R_{10} < 1.6$$

where $R_9$ is the radius of curvature the fourth lens element on the image side, and $R_{10}$ is the radius of curvature of the fifth lens element on the object side.

10. The Gaussian lens of claim 1, wherein the following condition is satisfied:

$$0.001 < (D_4 + D_9)/f < 0.017$$

where $D_4$ is the on-axis distance between the adjacent second and third lens element surfaces, $D_9$ is the on-axis distance between the adjacent fourth and fifth lens element surfaces, and f is the focal length of the Gaussian lens.

11. The Gaussian lens of claim 1, wherein the following condition is satisfied:

$$0.22 < D_{6-7}/f < 0.30$$

where $D_{6-7}$ is the on-axis distance between the adjacent third and fourth lens element surfaces, and f is the focal length of the Gaussian lens.

12. The Gaussian lens of claim 1, wherein the following condition is satisfied:

$$0.18 < D_{8-12}/f < 0.25$$

where $D_{8-12}$ is the on-axis distance between the object side surface of the fourth lens element and the image side surface of the sixth lens element, and f is the focal length of the Gaussian lens.

13. The Gaussian lens of claim 1, wherein the following condition is satisfied:

$$12.0 < v_2 - v_1 < 25.0$$

where $v_1$ is the Abbe number of the material of the first lens element, and $v_2$ is the Abbe number of the material of the second lens element.

14. The Gaussian lens of claim 1, wherein the following conditions is satisfied:

$$18.0 < v_2 - v_3 < 30.0$$

where $v_2$ is the Abbe number of the material of the second lens element, and $v_3$ is the Abbe number of the material of the third lens element.

15. The Gaussian lens of claim 1, wherein the following condition is satisfied:

$$35.0 < v_3 < 45.0$$

where $v_3$ is the Abbe number of the material of the third lens element.

* * * * *

UNITED STATES PATENT AND TRADEMARK OFFICE
CERTIFICATE OF CORRECTION

PATENT NO. : 6,519,097 B2
DATED : February 11, 2003
INVENTOR(S) : Kazunori Ohno

It is certified that error appears in the above-identified patent and that said Letters Patent is hereby corrected as shown below:

Column 1,
Line 67, change "invention." to -- invention; --;

Column 2,
Line 27, change "satisfied." to -- satisfied: --;
Lines 42 and 44, change "side;" to -- side, --;

Column 3,
Line 5, change "(11);" to -- (11): --;
Lines 14 and 16, change "element;" to -- element, --;
Line 21, change "then early" to -- the nearly --;

Column 8,
Line 15, change "$V_2 - V_3$" to -- $v_2 - v_3$ --;
Line 48, change "$N_4$" to -- $N_d$ --;
Line 48, change "at the line d" to -- at the d-line --;
Line 51, change "$F_{NO}$" to -- $F_{NO}$ --;

Column 9,
Line 37, change "at the line d" to -- at the d-line --;
Line 40, change "$F_{NO}$" to -- $F_{NO}$ --;

Column 10,
Line 24, change "at the line d" to -- at the d-line --;
Line 27, change "$F_{NO}$" to -- $F_{NO}$ --;

Column 11,
Line 9, change "at the line d" to -- at the d-line --;
Line 12, change "$F_{NO}$" to -- $F_{NO}$ --;
Line 63, change "Rather" to -- Rather, --;

UNITED STATES PATENT AND TRADEMARK OFFICE
CERTIFICATE OF CORRECTION

PATENT NO.    : 6,519,097 B2
DATED         : February 11, 2003
INVENTOR(S)   : Kazunori Ohno It is certified that error appears in the above-identified patent and that said Letters Patent is hereby corrected as shown below:

<u>Column 13,</u>
Line 57, change "curvature the " to -- curvature of the --; and <u>Column 14,</u>
Line 43, change "conditions" to -- condition --;

Signed and Sealed this

Fifteenth Day of July, 2003

JAMES E. ROGAN
*Director of the United States Patent and Trademark Office*